April 2, 1935.  E. R. POWELL  1,996,082
MINERAL WOOL PRODUCT AND METHOD OF MAKING SAME
Filed Aug. 26, 1931
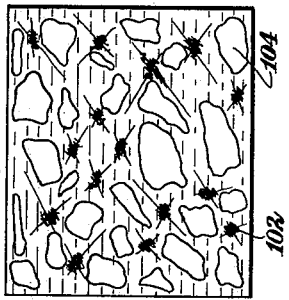
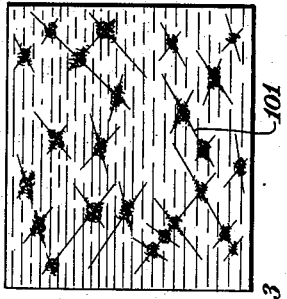
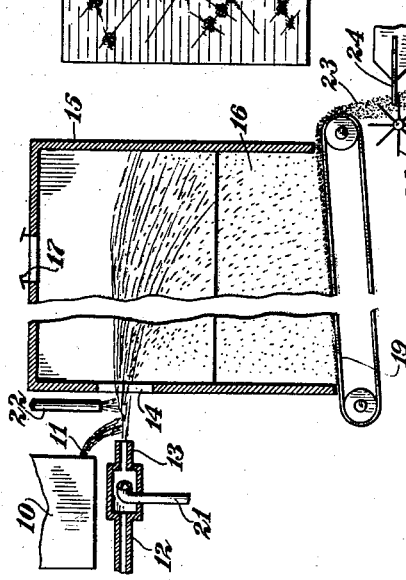
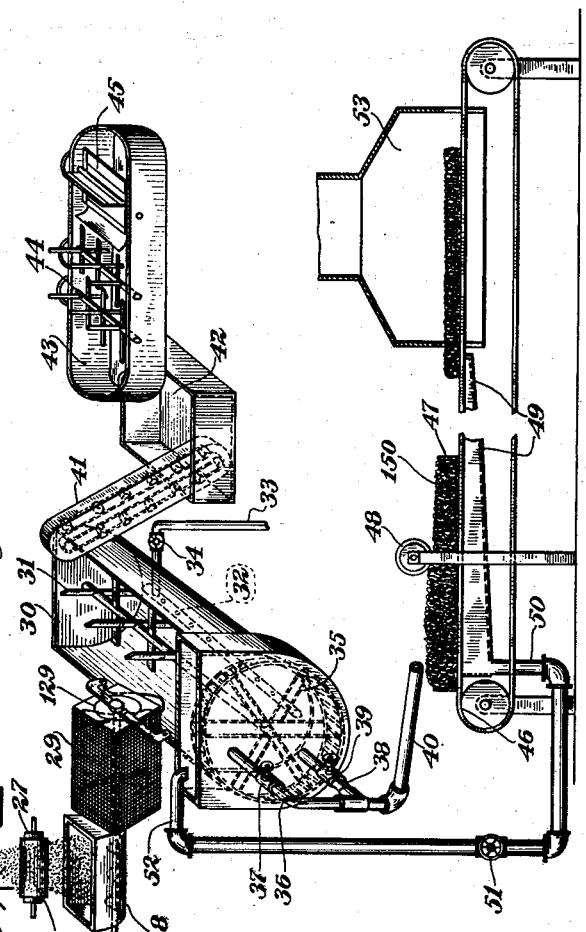
INVENTOR
Edward R. Powell.
BY
ATTORNEY Patented Apr. 2, 1935

1,996,082

UNITED STATES PATENT OFFICE 1,996,082

MINERAL WOOL PRODUCT AND METHOD OF MAKING SAME

Edward R. Powell, Alexandria, Ind., assignor to Johns-Manville Corporation, New York, N. Y., a corporation of New York Application August 26, 1931, Serial No. 559,480

4 Claims. (Cl. 92—21)

The present invention relates to improvements in mineral wool products, and in particular to an improved form of molded mineral wool blocks known in the art as "Rock cork". "Rock cork" is manufactured in shapes such as blocks of a size convenient for handling and comprises mineral wool integrally bonded by a suitable waterproofing binder such as asphalt.

In the manufacture of this product the rock, an argillaceous limestone, is melted in a cupola. Certain forms of slag may be substituted for the rock, the resulting product in either case may be properly termed mineral wool. The molten rock or slag is withdrawn from the cupola in the form of a thin stream and a suitable fluid jet such as steam is impinged thereon to blow the molten material into fibers. The mineral wool is then mixed in a vat with a sufficient amount of binding material, usually asphalt, to integrally bind the fibers, and water in sufficient amount to provide a semi-plastic mixture suitable for molding. This mixture is poured into molds having perforated screen bottoms and permitted to drain. The excess material at the top of the mold is screeded off with a suitable roll device or bar. After draining, the poured mass is sufficiently coherent to permit the removal of the side walls of the molds and the molded mass supported on the perforated or screen bottoms of the mold is placed in a suitable drier and the entrained water present in the block driven off. In drying a rough hard crust forms on the surfaces of the product and in finishing the product to size it is necessary to remove this crust from the surfaces by saws or some other convenient cutting or planing means. The finished product is widely used for insulation purposes and due to its capability of absorbing sound is also utilized for sound deadening purposes.

One of the disadvantages of the above process resides in the relatively large amount of water remaining in the product as sent to the dryer. One of the objects of this invention is the provision of the mineral wool component of the block in such a form that the liquid content does not penetrate thru the entire mass of wool and accordingly water is entrained to a lesser degree.

A further object of the invention is the provision of a molded mineral wool product characterized by a structure wherein the mineral wool is present in an aggregated form described hereinafter as nodules and clots and the liquid component including the binding material is largely confined to the interstices between the aggregates. Although the invention is particularly described in connection with a binding material including asphalt, other binders such as plaster of Paris, Portland cement, oxy-chloride cement, hydrated lime, clay, and other inexpensive and suitable binders commonly employed to bond mineral wool such as those disclosed in Hall Patent No. 811,778 may be employed.

The full nature of the invention will be understood from the accompanying drawing and the following description and claims:

In the drawing Fig. 1 is a pictorial illustration of the apparatus employed in the process. Fig. 2 is an enlarged and idealized plan view of the usual water soaked fiber in collected relation. Fig. 3 is an idealized plan view of the same material when aerated by the process invention. Fig. 4 is an idealized plan view of the preferred form of the block when aerated and dispersed by the preferred form of present invention.

In the drawing 10 indicates a furnace for melting ingredients necessary to form mineral fiber or wool which discharges as a molten stream at 11. 12 indicates a steam supply line which, through the nozzle 13, forces a spray into the opening 14 of a blow chamber 15 having inclined sides 16, a vent construction 17 at its upper end and a lower outlet 18 which registers with the upper run of an upwardly inclined endless belt. If desired, liquid hydrocarbon, preferably in the form of liquid petroleum wax, is introduced through the injector 21 at the blast station, and silicate of soda or other stiffening agent is introduced by the line 22 to the blast. Thus, the stiffening agent and the oil are intimately mixed with the fiber in the formation thereof.

In some instances, for certain purposes, from fifteen to twenty percent of petroleum residues,—chiefly the wax fractions,—is added to the wool and asphalts may be added for strengthening. Since the petroleum is combustible, it is necessary that the material be rapidly removed to a cooler location to prevent ignition. The inclined sides 16 discharge the settled fiber upon the conveyor 19 which, if desired, may be cooled and the wool is thereupon carried from the blow chamber. Conveyor 19 is relatively cool and therefore, the deposited fiber is cooled below the petroleum and asphalt ignition points. The fiber discharges at 23 into a shredding device which is diagrammatically illustrated as including a stationary rake 24 and a paddle rake 25.

This granulates the fiber and forms small nodules or aggregates or what is known in the trade as "granulated" wool so far as the physical or granulated form is concerned but the trade has never known this physical type of wool having water repellent characteristic.

The granulated wool discharges on to a cross conveyor 26 supported as at 27 and then discharges into a measuring hopper 28. Thus, a plurality of chamber discharges can be consolidated. The hopper 28 discharges a measured weight of fiber to a shot cleaning drum 29 which includes paddles 129 therein. Following shot removal, the granulated wool impregnated with the binding and stiffening materials previously set forth is discharged into a tumbling mixing tank 30 in which is mounted the agitating paddles 31. The fiber in addition to being shot cleaned in the rotatable drum or screen 29 is also formed into larger aggregates or clots which are shown at 100 in Fig. 4. These clots vary in size from about one-eighth inch to one and one-half inches and vary in size therebetween. The varying sizes of clots secures decreased density in the block by reason of closer packing of the clots and requires less volume of the binder by reason of the increased packing of said clots and such increased packing forms an initial weight of block wherein the majority of the body of the block in its formation is comprised of clots and not of water or the liquid component. Heretofore in the manufacture of rock cork the fibrous material in the initial mix was saturated with the liquid component while with the present invention the liquid component including the water is largely restricted to the space between the clots as illustrated in Fig. 4 and hence is required in amounts just sufficient to provide the required degree of fluidity in the mixing and molding operation.

To the mixer 30—31 there is added a fixed volume of binder which consists of a mixture of water, asphalt and paper pulp, that is, paper pulp which has been beat up with asphalt, and is a pulp in which the asphalt, by reason of diffusion or the formation of an emulsion, is not subject to material separation from the paper.

The asphaltic material in a liquid state is supplied to the beater 43 together with sufficient paper or similar pulp material to cause the liquid water proofing binder and pulp to mix into a semi-plastic state. The mixing is accomplished by means of the stirring paddle 45 and the mixing paddles 44. The semi-plastic mass of liquid and pulp flows into the hopper 42 and is elevated therefrom by the elevator 41 and dumped into the end of the mixer 30—31 at the same end in which the wool is discharged. The buckets measure the pulp supplied. The binder is then thoroughly mixed by the mixer 31 with the fibrous material in the presence of the water contained in the mixer 30. These paddles not only mix the binder, loose fibers and clotted fibers, but also gradually move them both toward the discharge end of the vat.

In the discharge end of the vat there are mounted the two-layer separated outlets 36 and 38 controlled by valves 37 and 39, respectively. This multiple discharge insures the removal from said trough of the two dissimilar materials therein, to-wit, that is that which is light and substantially floats, i. e., the clotted material and that which is heavy and substantially sinks, i. e., the water-wet loose fibers. The oil impregnated clots are drawn off by the top pipe and the water wet fiber is drawn off by the bottom pipe. The two discharges mix in pipe 40 which constitutes a common discharge.

In order to handle the material in a flowing state, water is required, but in order to produce a block having an initial size substantially that of its final size when dried, it is necessary that the amount of water employed be reduced to the minimum. A means for obtaining and maintaining such a low water condition of the material is by aerating the same, for by so doing, the entrapped gas or air bubbles displaces an equivalent amount of water. Pipe 33, controlled by valve 34, connects with an outlet consisting of a perforated pipe 32 in the bottom of mixer 30 so that while the binder and the wool are being mixed in the presence of water in the mixer, the whole is being aerated.

Aeration distributes the water in a thin film about the clots because said clots have a water-repellent surface. For some reason, at present unknown, the clots become stiffer by reason of having been moistened upon their exterior surfaces and subsequently dried than if they had not been wet but had been baked direct.

Another and chemical method of introducing these bubbles is to include in the mix at this point a mineral yeast, such as marble dust and alum which by reaction liberates the gas in the form of bubbles, which are distributed throughout the mass of the fiber forming the block and without any apparent deleterious effect upon the block. The gas bubbles, howsoever introduced and distributed, displace part of the water which heretofore filled the spaces between the clots not otherwise occupied by the asphalt coated binder and detached mineral fiber since all the fiber is not clotted.

With the addition of gas bubbles, and the inclusion of clots, closely packed by reason of various sizes, a block can be produced by the use of but little water during the production so that the ultimate block size will be substantially that of the initial block.

Pipe 40 discharges the material to an open conveyor 46 carrying a supporting and draining screen (not shown) associated with which is a removable form 47, forming a box which is filled with the mixture discharged. The surplus or free water drains into trough 49 beneath the conveyor and pipe 50 through the pump 51 returns the discharged water through pipe 52 to the mixer 30. In addition to free drainage before described, a roller 48 or other equivalent squeezer or pressing means is provided which will express from the material 150 in sheet formation additional surplus water, and will also level or screed and compress the material to a substantially predetermined size, which is substantially that of the final size of the dried block. Following pressing or squeezing the detachable form of the box 47 may be removed and the screen with the material in block or sheet form thereon may be passed into and through a heater 53, and thence removed and dressed to size in the conventional manner described above and followed in the manufacture of "rock cork" that is by removal of the hard rough surfaces necessarily formed during drying by suitable planing means. If desired, in the foregoing operation, the screen or form box 47 may be agitated to not only assist in the separation of the free water from the material but also to assist in the closer packing of the clots.

The discharged mixture, after being pressed to expel the surplus water therefrom and to bring the free fibers and associated clots closer together, is passed to a dryer. The heating in the dryer may be continued to the desired degree and extent until the block is sufficiently hardened.

The invention is not necessarily restricted to the formation of clots and aeration in combination as shown in Fig. 4. Non-clotted fibrous material shown in Fig. 3 therefore may be aerated and thus a considerable portion of the water displaced by bubbles 104, and in this way a fibrous material may be handled or further manipulated with a considerable lesser amount of water than heretofore required. The aforesaid aeration can be obtained by either of the two before-mentioned methods set forth or by any other equivalent method. The waterproofed clots also may be employed without additional areation. The novelty consists in either or both steps.

Also, the binder and stiffening agents need not necessarily be mixed with the fiber at the time of formation, but the fiber may be sprayed either after it discharges from the shot screen 29 or when it is being tumbled in the trough 28, except that to be effective it must be added before the asphalt coated paper pulp binder is added, which is a water suspension or emulsion containing those last mentioned ingredients. Another method of treating the nodulated wool with the waterproofing binder is to introduce the same on to the nodules by a solvent and after introducing the binder in this fashion, the solvent is driven off and suitably recovered, leaving the binder entrapped in the material.

The water-repellent granular mineral wool above described may be used for general purposes. With such a product it is possible to make self drying compositions by a mixture with plaster of Paris, Portland cement, oxy-chloride cements and the like, and have these other materials take up the entire amount of water present so that the composition will be self-drying. Ordinary "granulated" wool, as heretofore known, if used for this purpose, absorbs such a large volume of water that the other ingredients can take up but a small part of it, and the remainder must be dried from the surface, which may take weeks or months.

The water-repellent granulated wool may also be employed for the manufacture of monolithic insulations for oil refinery work and other similar purposes. Such insulations are produced by mixing the granulated wool, hydrated lime, clay, Portland cement and other inexpensive binders, also some short asbestos fiber and diatomaceous earth.

The foregoing application is a continuation in part of my copending application Serial No. 301,851, filed August 24, 1928.

What I claim is:

1. A method of preparing mineral wool in aggregate form, which comprises applying a water-repellent coating to the surfaces of the individual fibers and shredding the fibers into granules.

2. As an article of manufacture, granulated mineral wool provided with a water-repellent surface.

3. A method of preparing mineral wool in aggregate form, which comprises blowing molten rock or slag into fibrous form, applying a water-repellent coating to the fibers during the blowing operation, and thereafter shredding the water-repellent fibers into granules.

4. A method of preparing molded shapes from mineral wool which comprises applying a water-repellent coating to mineral wool fibers, mechanically processing the loose mass of water-repellent fibers into nodules or small wads, admixing the water-repellent nodules thus formed with water and a binder to form a semi-fluid mix, introducing the mixture into molds and permitting water to drain freely therefrom, and thereafter drying the molded mass.

EDWARD R. POWELL.